United States Patent
Komatsu

(10) Patent No.: US 10,277,365 B2
(45) Date of Patent: Apr. 30, 2019

(54) COMMUNICATION APPARATUS, COMMUNICATION CONTROL METHOD, AND COMPUTER PROGRAM

(71) Applicant: NEC Corporation, Minato-ku, Tokyo (JP)

(72) Inventor: Masahiro Komatsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/584,250

(22) Filed: May 2, 2017

(65) Prior Publication Data
US 2017/0353274 A1    Dec. 7, 2017

(30) Foreign Application Priority Data
Jun. 3, 2016 (JP) ................................. 2016-111780

(51) Int. Cl.
| | |
|---|---|
| H04L 1/18 | (2006.01) |
| H04L 12/06 | (2006.01) |
| H04W 72/10 | (2009.01) |
| H04L 1/08 | (2006.01) |
| H04J 3/22 | (2006.01) |
| H04W 28/04 | (2009.01) |
| H04L 1/00 | (2006.01) |

(52) U.S. Cl.
CPC .............. *H04L 1/1825* (2013.01); *H04L 1/08* (2013.01); *H04L 1/1867* (2013.01); *H04L 12/06* (2013.01); *H04W 72/10* (2013.01); *H04J 3/22* (2013.01); *H04L 1/1835* (2013.01); *H04L 2001/0097* (2013.01); *H04W 28/04* (2013.01)

(58) Field of Classification Search
CPC ..... H04L 1/1825; H04L 1/1835; H04L 12/06; H04W 76/36; H04W 72/10; H04W 28/04; H04J 3/22
USPC .......................................... 455/88
See application file for complete search history.

(56) References Cited

U.S. PATENT DOCUMENTS

| | | | |
|---|---|---|---|
| 7,523,342 B1 * | 4/2009 | Fu .................. | H04L 1/0045 714/4.12 |
| 2008/0070614 A1 * | 3/2008 | Ogushi ............. | H04W 52/0216 455/522 |

FOREIGN PATENT DOCUMENTS

WO    2011/145474 A1    11/2011

* cited by examiner

*Primary Examiner* — Eugene Yun

(57) ABSTRACT

A communication apparatus comprises: a controller, a sender and a receiver. The controller determines, among data units provided with reference numbers, a first group that includes data units to be sent to another communication apparatus. The sender sends the data units to another communication apparatus. The receiver receives, from another communication apparatus, information that indicates a reception situation regarding the data units. The sender execute a re-sending process of the data unit corresponding to the reception error when the reception situation indicates a reception error The controller either prevent the sender from sending a data unit in a second group when the sender is executing the re-sending process or stop the re-sending process when the receiver receives a report of arrival of the data unit corresponding to the reception error from the another communication apparatus while the sender is executing the re-sending process.

9 Claims, 5 Drawing Sheets ial field.

COMMUNICATION APPARATUS, COMMUNICATION CONTROL METHOD, AND COMPUTER PROGRAM

This application is based upon and claims the benefit of priority from Japanese Patent Application No. 2016-111780, filed on Jun. 3, 2016, the disclosure of which is incorporated herein in its entirety by reference.

TECHNICAL FIELD

The present invention relates to a sending control technology in sending information.

BACKGROUND ART

As illustrated in FIG. 3, a wireless access network (evolved universal terrestrial radio access network (E-UTRAN)) 1 in a mobile communication system of a long term evolution (LTE) method includes a base station eNB and a mobile station UE. The base station eNB and the mobile station UE communicate via a radio link RL. Furthermore, the base station eNB and the mobile station UE each include a layer structure 3 based on a function related to wireless communication and a wireless unit 8.

The layer structure 3 includes a packet data convergence protocol (PDCP) sub-layer 4, a radio link control (RLC) sub-layer 5, a medium access control (MAC) sub-layer 6, and a physical layer 7.

Each layer structure 3 of the base station eNB and the mobile station UE, when sending data, performs a PDCP process, a RLC process, a MAC process, and a physical (PHY) process in sequence on sending-object data and then outputs the processed data to the wireless unit 8. As for the PDCP process, the RLC process, the MAC process, and the PHY process, process contents are respectively determined in accordance with a specification of a communication method, and a state of data output from the layer structure 3 to the wireless unit 8 is a state in accordance with the specification. The wireless unit 8 generates a signal for communication by modulating the data output from the layer structure 3, and sends the signal for communication to a communication partner via the radio link RL.

Next, with reference to FIG. 4, processes of the RLC sub-layer 5 and the MAC sub-layer 6 will be described. Note that the process of the RLC sub-layer 5 includes a plurality of types such as a transparent mode (TM), an unacknowledged mode (UM), and an acknowledged mode (AM). Out of such processes, a process performed in the AM by the RLC sub-layer 5 will be described.

The RLC sub-layer 5 includes, as functional portions, a service data unit (SDU) receiver 10, a protocol data unit (PDU) generator 11, a PDU sender 12, a PDU receiver 13, an SDU generator 14, an SDU sender 15, and a controller 18. The RLC sub-layer 5 further includes a sending buffer 16 and a receiving buffer 17 as storage portions.

The MAC sub-layer 6 includes, as functional portions, an SDU receiver 20, a PDU generator 21, a PDU sender 22, a PDU receiver 23, an SDU generator 24, an SDU sender 25, a hybrid automatic repeat request (HARQ) information portion 27, and a controller 28.

The SDU receiver 10 of the RLC sub-layer 5 has a function of receiving, from the PDCP sub-layer 4, an RLC-service data unit (RLC-SDU) as sending-object data. The SDU receiver 10 further has a function of, upon receiving an RLC-SDU, storing the RLC-SDU in the sending buffer 16.

The PDU generator 11 has a function of acquiring a sending-object RLC-SDU from the sending buffer 16 and generating an RLC-protocol data unit (PDU) by processing the RLC-SDU. In other words, the PDU generator 11 divides and/or integrates the RLC-SDU into processing units having lengths suitable for re-sending control and sequence control in accordance with the communication method, and generates an RLC-PDU by attaching control information as header information to the divided/integrated data. The control information (header information) contained in the RLC-PDU includes information that is used for error detection or communication control such as flow control. For example, the RLC-PDU contains, as control information, a sequence number SN for use in window control. The sequence number SN is information that represents a sequence of data and also information that represents a range of a window in accordance with an amount of data that can be sent altogether to a communication partner. The sequence number SN increases from an initial value by one at a time and, after reaching a set upper-limit value, returns to the initial value. Thus, in the sequence number SN, integer values within a set numerical value range are repeatedly set in sequence. In this configuration, a range of a window (window size) is set to a range whose size is half the range from the initial value to the upper-limit value of the sequence number SN.

The controller 18 has a function of, on the basis of control information attached to data sent from a communication partner, acquiring a situation of reception of data at the communication partner, and managing a sequence number SN that the PDU generator 11 utilizes. Therefore, when attaching the sequence number SN to an RLC-SDU, the PDU generator 11 acquires information about the sequence number SN from the controller 18.

Furthermore, the PDU generator 11 has a function of acquiring a window size of a communication partner by reading, from the controller 18, a sequence number SN contained in control information sent from the communication partner and looking up the sequence number SN. The PDU generator 11 further has a function of controlling RLC-PDUs generated in such a way that a sequence number SN attached to data to be sent to a communication partner does not exceed a range of a window of the communication partner (a size of a receiving window).

Furthermore, the PDU generator 11 has a function of generating an RLC-PDU that has delivery confirmation information as control information in order to notify a communication partner whether or not the RLC sub-layer 5 has received data sent from the communication partner. Specifically, the PDU generator 11, using the sequence number SN managed by the controller 18, generates an RLC-PDU that has, as control information (delivery confirmation information), an ACK (acknowledgement) that indicates "received" or a NACK (negative acknowledgement) that indicates "unreceived".

The PDU sender 12 has a function of sending the RLC-PDU generated by the PDU generator 11 to the MAC sub-layer 6.

In the MAC sub-layer 6, the SDU receiver 20 has a function of receiving, as an MAC-SDU, an RLC-PDU sent from the RLC sub-layer 5. The PDU generator 21 has a function of generating a MAC-PDU by multiplexing a plurality of MAC-SDUs received by the SDU receiver 20. The PDU generator 21 further has a function of holding the generated MAC-PDU until it is detected that the communication partner correctly receives the MAC-PDU.

The PDU sender 22 has a function of sending the MAC-PDU generated by the PDU generator 21 to the physical layer 7. The MAC-PDU sent by the PDU sender 22 is processed by the physical layer 7. Furthermore, the MAC-PDU processed by the physical layer 7 is sent by the wireless unit 8 from one of the base station eNB and the mobile station UE to the other one that is the communication partner, via the radio link RL.

The PDU receiver 23 of the MAC sub-layer 6 has a function of receiving an MAC-PDU sent from a communication partner and passed through the wireless unit 8 and the physical layer 7. The PDU receiver 23 further has a function of passing the received MAC-PDU to the HARQ information unit 27 and the SDU generator 24.

The HARQ (hybrid automatic repeat request) information unit 27 has a function of determining whether or not an error has occurred in the MAC-PDU received from the communication partner and, when an error has occurred, sending, to the communication partner, HARQ information that requests the data to be re-sent.

The controller 28 has a function of, when receiving HARQ information from a communication partner, controlling the PDU generator 21 so that the communication partner re-sends the MAC-PDU in which an error occurs. The PDU generator 21, on the basis of the control by the controller 28, outputs, to the PDU sender 22, the re-sending-object MAC-PDU. Therefore, the re-sending-object MAC-PDU is re-sent from the PDU sender 22 to the communication partner, passing through the physical layer 7, the wireless unit 8, and the radio link RL in order. A sequence number SN attached to the MAC-PDU re-sent in this manner is the same as the sequence number SN attached in the first sending.

The SDU generator 24 has a function of decomposing the MAC-PDU received by the PDU receiver 23. That is, the PDU generator 21 of the MAC sub-layer 6 of the communication partner generates the MAC-PDU by multiplexing a plurality of MAC-SDUs. Therefore, the MAC-PDU that the SDU generator 24 receives from the communication partner is a signal generated by multiplexing a plurality of MAC-SDUs. The SDU generator 24 decomposes the MAC-PDU to generate a plurality of MAC-SDUs. The SDU sender 25 sends the plurality of MAC-SDUs generated by the SDU generator 24 to the PDU receiver 13 of the RLC sub-layer 5.

The PDU receiver 13 in the RLC sub-layer 5 has a function of receiving, as an RLC-PDU, an MAC-SDU received from the MAC sub-layer 6. The PDU receiver 13 further has a function of notifying the controller 18 of control information (delivery confirmation information) attached to the received RLC-PDU and storing the other information in the receiving buffer 17. When storing the RLC-PDU in the receiving buffer 17, the PDU receiver 13 takes into account a window size (range of a receiving window) set in the receiving buffer 17 to store the RLC-PDU in the receiving buffer 17. That is, the PDU receiver 13 detects a sequence number SN attached to the RLC-PDU to be stored, and stores only data about the sequence number SN within the set range of the receiving window in the receiving buffer 17.

The SDU generator 14 has a function of acquiring an RLC-PDU from the receiving buffer 17 and generating an RLC-SDU, based on the acquired RLC-PDU. The SDU sender 15 has a function of sending the RLC-SDU generated by the SDU generator 14 to a PDCP sub-layer 4.

Note that PTL 1 discloses a configuration devised to prevent a problem that a throughput decreases because information needed for a re-sending function of a MAC sub-layer does not arrive from a communication partner.

A communication system as described above has a problem that a data sending process based on a window size and a sequence number SN by the RLC sub-layer 5 and a re-sending process by the MAC sub-layer 6 result in a fault in data that a communication partner receives.

This problem will be described by using a specific example illustrated in FIG. 5. Note that data transmission from a base station eNB to a mobile station UE will be used as an example below. Furthermore, it is assumed that integer values of "0" to "1023" are used as sequence numbers SN and a size of windows (a sending window and a receiving window) is 512, which is half the range width 1024 of the sequence numbers SN.

In the following description, it is assumed that data provided with sequence numbers SN up to "99" have reached the mobile station UE being a receiving side. In this case, the sequence number SN that indicates the lower end of a sending window set in the sending buffer 16 of the base station eNB being a sending side is "100" and the sequence number SN that indicates the upper end of the sending window is "611". Furthermore, the sequence number SN that indicates the lower end of a receiving window set in the receiving buffer 17 in the mobile station UE is "100" and the sequence number SN that indicates the upper end of the receiving window is "611".

For example, it is assumed that, at a time T1, data with a sequence number SN=100 is sent from the base station eNB toward the mobile station UE via processing by the RLC sub-layer 5 and the MAC sub-layer 6 of the base station eNB being the sending side. However, when an error occurs in the data in a communication path, HARQ re-sending is performed by a process by the MAC sub-layer 6. When data without error are not delivered to the mobile station UE although a maximum number of times of re-sending of HARQ is reached, a process by the RLC sub-layer 5 of the mobile station UE is performed at a time T2 to send, from the mobile station UE to the base station eNB, a re-sending request that requests re-sending of the data whose sequence number SN=100.

When, at a time T3, the re-sending request reaches the RLC sub-layer 5 of the base station eNB, a process by the RLC sub-layer 5 of the base station eNB is performed at a time T4 in accordance with the re-sending request to re-send the data whose sequence number SN=100 toward the mobile station UE. However, in the example in FIG. 5, it is assumed that data initially sent by the re-sending process by the RLC sub-layer 5 result in being undelivered due to occurrence of an error and data subsequently re-sent by the re-sending process by the MAC sub-layer 6 also result in being undelivered due to occurrence of an error. Furthermore, it is assumed that the data sent by the subsequent re-sending process by the MAC sub-layer 6 reach the RLC sub-layer 5 of the mobile station UE at a time T7.

On the other hand, it is assumed that, by a process performed by the RLC sub-layer 5 of the base station eNB, data having sequence numbers SN=100 to 611 within a range of a receiving window of the mobile station UE are sequentially sent toward the mobile station UE before a time T6. It is also assumed that data with the last sequence number SN=611 reached the RLC sub-layer 5 of the mobile station UE before a time T9. In this case, the sequence number SN that indicates the lower end of the receiving window of the mobile station UE becomes "612" and the sequence number SN that indicates the upper end of the receiving window becomes "99".

Furthermore, by a process performed by the RLC sub-layer 5 of the mobile station UE caused by arrival of the data, a report of arrival that notifies the arrival of the data whose sequence numbers SN=100 to 611 is sent from the mobile station UE toward the base station eNB at a time T11. Then, at a time T12, the report of arrival reaches the RLC sub-layer 5 of the base station eNB. In response to the report of arrival, the base station eNB updates a range of a sending window to the next range of the sending window. Thus, the sequence number SN that indicates the lower end of the sending window of the base station eNB becomes "612" and the sequence number SN that indicates the upper end of the sending window becomes "99".

Then, at a time T13, a process by the RLC sub-layer 5 of the base station eNB is performed, thereby sending data whose sequence number SN=612 within the range of the sending window. The data arrives at the RLC sub-layer 5 of the mobile station UE at a time T14. Thus, the sequence number SN that indicates the lower end of the receiving window in the mobile station UE becomes "613" and the sequence number SN that indicates the upper end of the receiving window becomes "100".

By the way, it sometimes happens that prior to the time T7 at which the data whose sequence number SN=100 reaches the RLC sub-layer 5 of the mobile station UE being the receiving side by the re-sending process performed by the MAC sub-layer 6, a re-sending request for the data is output from the RLC sub-layer 5 of the mobile station UE. In this example, at a time T5 prior to the time T7, the re-sending request for the data whose sequence number SN=100 is output from the RLC sub-layer 5 of the mobile station UE. Then, at a time T8, the re-sending request reaches the RLC sub-layer 5 of the base station eNB. By a process performed by the RLC sub-layer 5 of the base station eNB in accordance with the re-sending request, the data with a sequence number SN=100 is re-sent toward the mobile station UE at a time T10. It is assumed that an error occurs on the re-sent data and that while the re-sending process by the MAC sub-layer 6 of the base station eNB is repeatedly performed, the data up to whose sequence number SN=611 have reached the mobile station UE at the time T9 as stated above. After that, when, at a time T14, the data up to whose sequence number SN=612 have further reached the mobile station UE, the sequence number SN that indicates the lower end of the receiving window of the mobile station UE becomes "613" and the sequence number SN that indicates the upper end of the window becomes "100". It is assumed that when the receiving window has this range, the data whose sequence number SN=100 arrives at the RLC sub-layer 5 of the mobile station UE at a time T15 due to the re-sending process by the MAC sub-layer 6. Although the data is old data with a sequence number SN one cycle behind, the sequence number SN of the data is within the range of the receiving window. Therefore, the mobile station UE can receive the data with the sequence number SN=100 which is sent by the re-sending process performed by the MAC sub-layer 6 of the base station eNB, and falsely recognizes and therefore receives the received old data as the latest data.

In other words, because of a relation between a window size and a range of sequence numbers SN attached to sending-object data and a re-sending process performed by the MAC sub-layer 6, old data are received as the latest data, resulting in a problem of the received data having a fault.

CITATION LIST

Patent Literature

[PTL 1]: International Publication No. WO 2011/145474

SUMMARY

The disclosure has been devised to solve the foregoing problem. That is, an example of objects of the disclosure is to provide a technology that prevents a fault from occurring in data received by a communication partner due to a process of sequentially sending data and a re-sending process of re-sending data for the purpose of error correction.

In order to achieve the foregoing example of the objects, a communication apparatus of the disclosure comprises:

a controller configured to determine, among data units provided with reference numbers, a first group that includes data units to be sent to another communication apparatus;

a sender configured to send the data units in the first group to the another communication apparatus; and a receiver configured to receive, from the another communication apparatus, information that indicates a reception situation regarding the data units in the first group, wherein the sender is configured to, when the reception situation indicates a reception error regarding at least one of the data units in the first group, execute a re-sending process of the data unit corresponding to the reception error, and the controller is configured to either prevent the sender from sending a data unit in a second group when the sender is executing the re-sending process of the data unit corresponding to the reception error or stop the re-sending process executed by the sender when the receiver receives a report of arrival of the data unit corresponding to the reception error from the another communication apparatus while the sender is executing the re-sending process of the data unit corresponding to the reception error.

A communication control method of the present disclosure comprises:

determining, among data units provided with reference numbers, a first group that includes data units to be sent to another communication apparatus;

sending the data units in the first group to the another communication apparatus;

receiving, from the another communication apparatus, information that indicates a reception situation regarding the data units in the first group;

executing, when the reception situation indicates a reception error regarding at least one of the data units in the first group, a re-sending process of the data unit corresponding to the reception error; and either preventing a data unit in a second group from being sent when a re-sending process of the data unit corresponding to the reception error is being executed or stopping the re-sending process when a report of arrival of the data unit corresponding to the reception error is received from the another communication apparatus while the re-sending process of the data unit corresponding to the reception error is being executed.

A program of a non-temporary program-recording medium of the present disclosure causes a computer to execute the steps of:

determining, among data units provided with reference numbers, a first group that includes data units to be sent to another communication apparatus;

sending the data units in the first group to the another communication apparatus;

receiving, from the another communication apparatus, information that indicates a reception situation regarding the data units in the first group;

executing, when the reception situation indicates a reception error regarding at least one of the data units in the first group, a re-sending process of the data unit corresponding to the reception error; and either preventing a data unit in a second group from being sent when a re-sending process of the data unit corresponding to the reception error is being executed or stopping the re-sending process when a report of arrival of the data unit corresponding to the reception error is received from the another communication apparatus while the re-sending process of the data unit corresponding to the reception error is being executed.

Note that the foregoing example of the objects of the present disclosure is achieved also by the communication control method of the present disclosure corresponding to the communication apparatus of the present disclosure. Furthermore, the foregoing example of the objects of the present disclosure is achieved also by the computer program of the present disclosure corresponding to the communication apparatus and the communication control method of the present disclosure.

EXEMPLARY EMBODIMENTS

Figure 1:
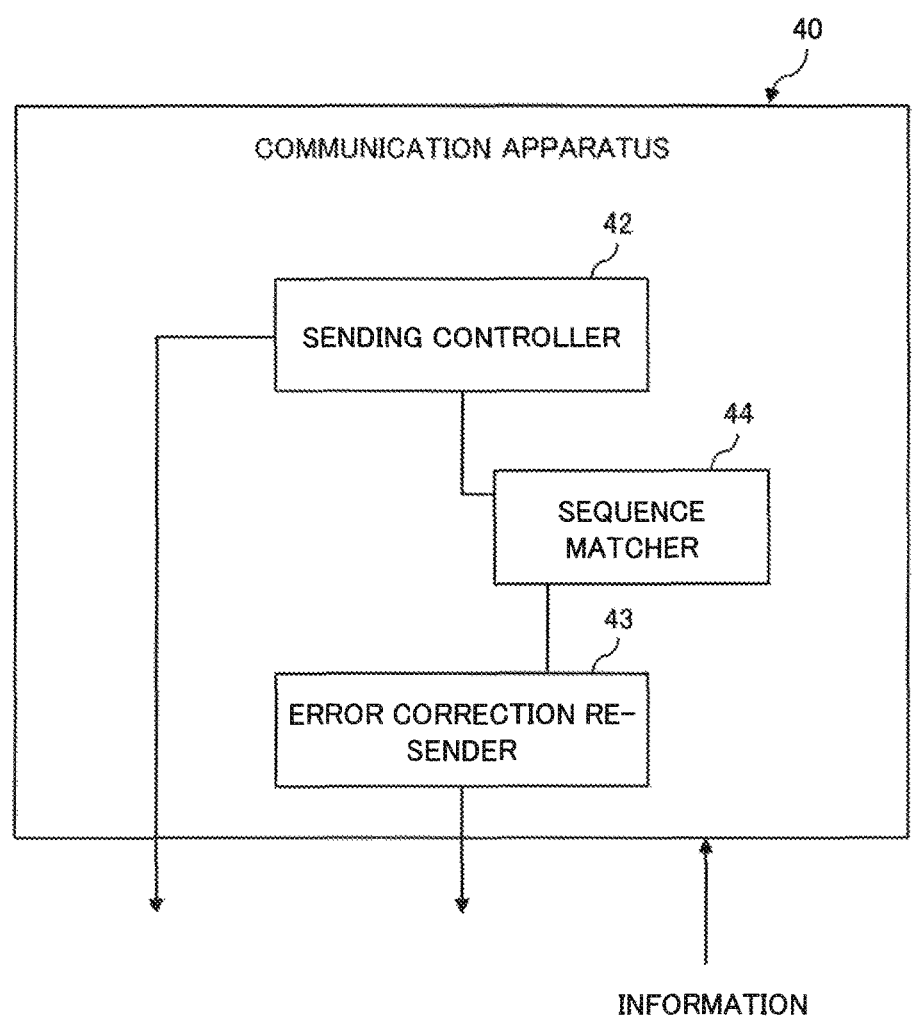
FIG. 1 is a block diagram illustrating a configuration of a communication apparatus of a first exemplary embodiment according to the present disclosure.

Exemplary embodiments according to the present disclosure will be described hereinafter with reference to the drawings. Note that unidirectional arrows in the drawings each plainly indicate a signal flowing direction and do not exclude bidirectionality.

First Exemplary Embodiment

FIG. 1 is a simplified block diagram illustrating a configuration of a communication apparatus of a first exemplary embodiment according to the present invention. A communication apparatus 40 of the first exemplary embodiment includes a sending controller 42, an error correction re-sender 43, and a sequence matcher 44. The sending controller 42 has a function of sending, of the data in a sending unit that are provided with reference numbers according to an alignment sequence of the data, data provided with reference numbers within a sending-object reference number range to a communication partner. The sending controller 42 also has a function of updating the sending-object reference number range to a next sending-object reference number range on the basis of information that represents a situation of reception notified by the communication partner. The sending controller 42 is able to sequentially send data to the communication partner by updating the sending-object reference number range in this manner.

The error correction re-sender 43 has a function of re-sending to the communication partner correction-object data so as to correct a data error on the basis of information on occurrence of a data error caused by communication which is notified by the communication partner.

The sequence matcher 44 has a function of blocking the sending controller 42 from updating the sending-object reference number range during a re-sending process in which the error correction re-sender 43 is re-sending error correction-object data. Alternatively, the sequence matcher 44 has a function of stopping the re-sending process performed by the error correction re-sender 43 when it has received a report of arrival of error correction-object data from the communication partner although the error correction re-sender 43 is performing the re-sending process.

The communication apparatus 40 of the first exemplary embodiment can avoid the event that a fault occurs in the sequence of data sent to the communication partner because it comprises the sequence matcher 44. More specifically, let it be assumed that during the data re-sending process by the error correction re-sender 43, the sending controller 42 has updated the sending-object reference number range to the next reference number range. In that case, although the sending of data having a reference number within a pre-update sending-object reference number range has not been completed, the sending of data having a reference number within a post-update reference number range starts. Therefore, there is a possibility of occurrence of a data reception fault in which data having a reference number within the pre-update reference number range is received by the communication partner after data having a reference number within the post-update reference number range is received by the communication partner.

This problem is coped with by the first exemplary embodiment as follows. During the data re-sending process by the error correction re-sender 43, the sequence matcher 44 blocks the updating of the sending-object reference number range by the sending controller 42. Alternatively, when a report of arrival of the error correction-object data is received from the communication partner while the error correction re-sender 43 is performing the re-sending process of the data, the sequence matcher 44 stops the re-sending process by the error correction re-sender 43. This can avoid the event that data having a reference number in the pre-update reference number range is received by the communication partner after data having a reference number in a post-update reference number range is received by a communication partner. Therefore, the communication apparatus 40 of the first exemplary embodiment can prevent a fault that data prior to an update and data subsequent to the update in the sending-object reference number range are received in a mingled manner by a communication partner.

Note that the communication apparatus 40 of the first exemplary embodiment includes, for example, a central processing unit (CPU) that executes a computer program that contains a processing procedure that realizes functions as described above, so that the functions as described above are realized.

Second Exemplary Embodiment

A second exemplary embodiment according to the present invention will be described below.

Figure 2:
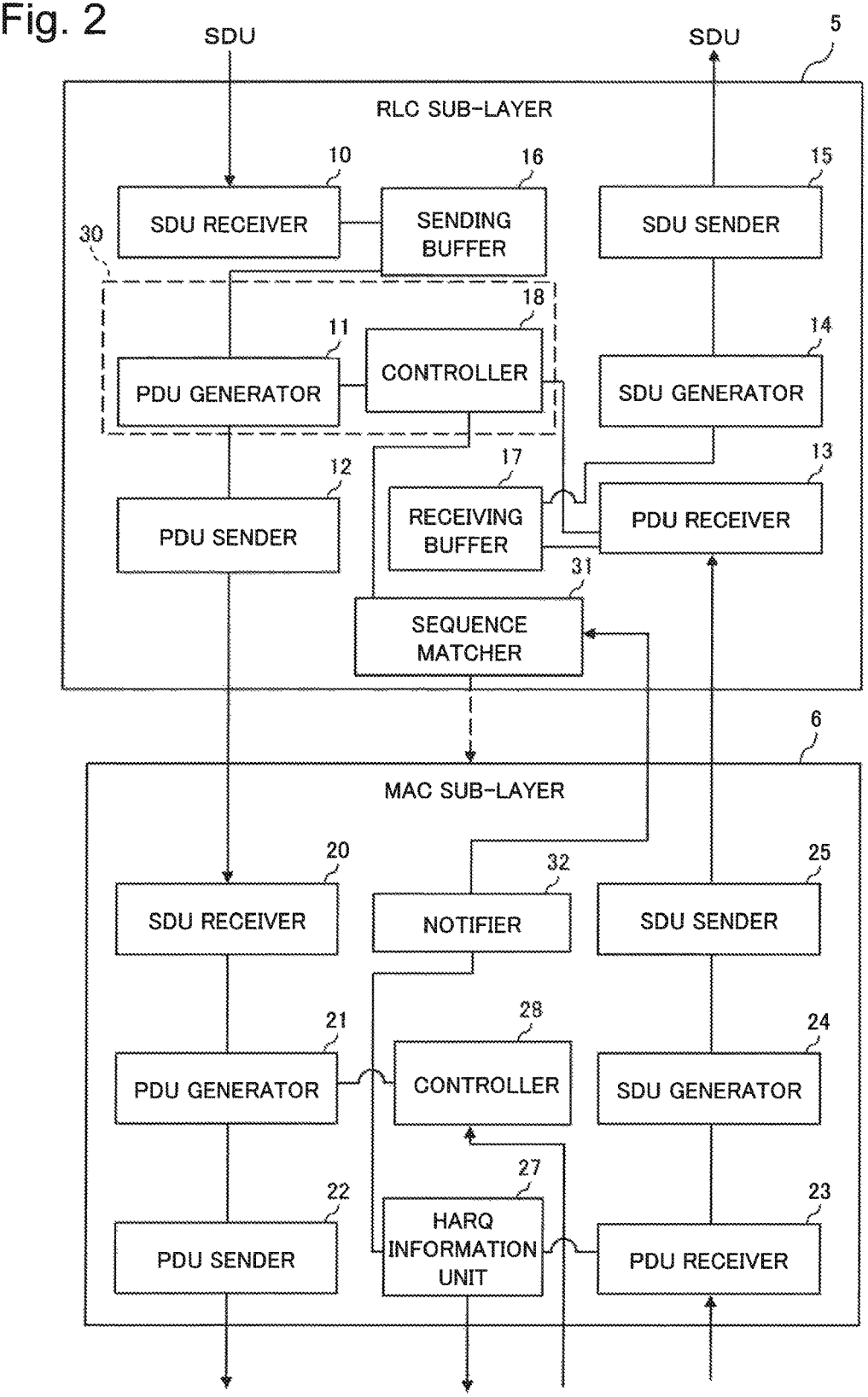
FIG. 2 is a block diagram illustrating a configuration of a communication apparatus of a second exemplary embodiment according to the present disclosure.
Figure 3:
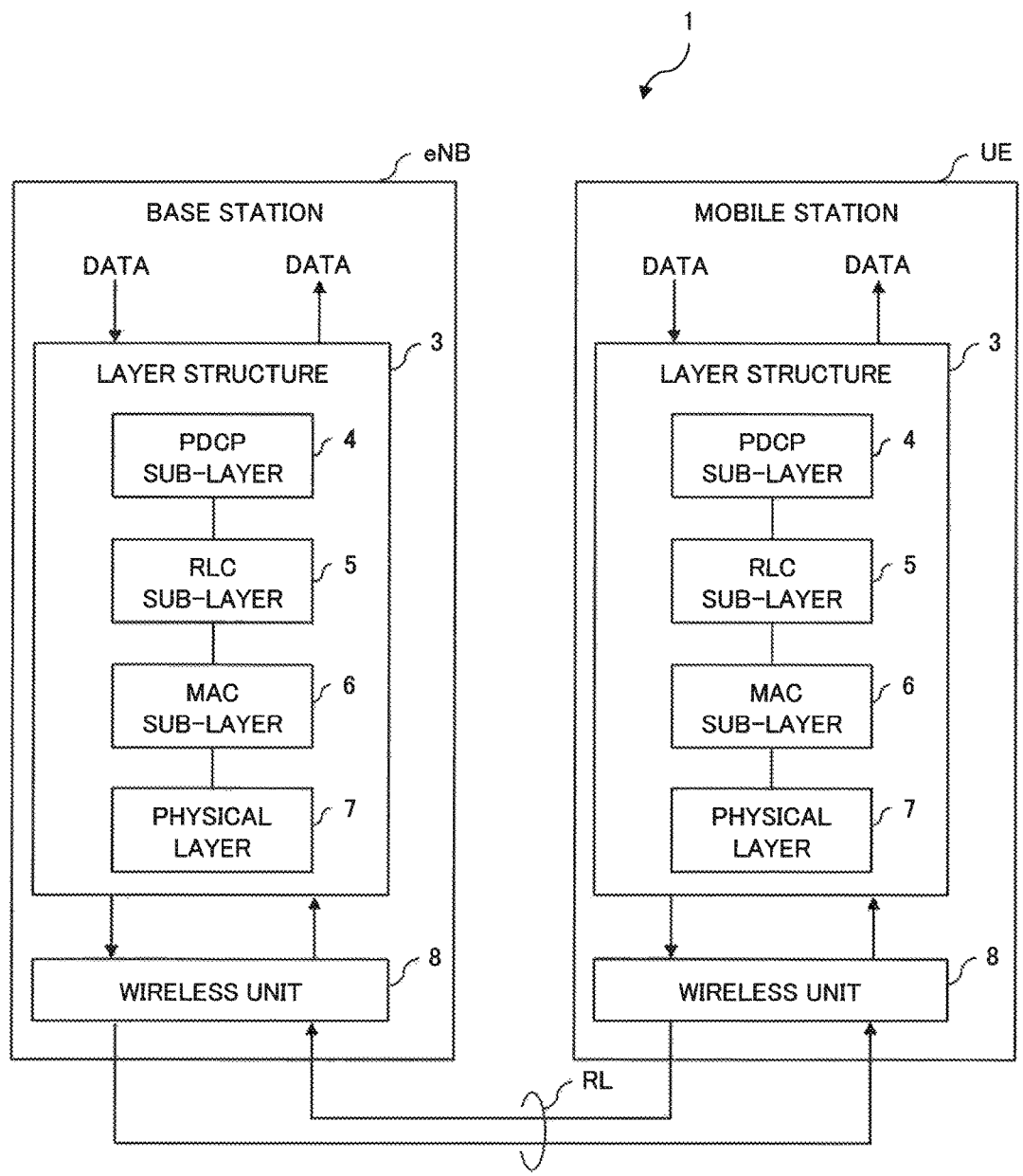
FIG. 3 is a diagram illustrating an example of a wireless access network.

A communication apparatus of the second exemplary embodiment according to the present invention includes a layer structure 3 and a wireless unit 8 illustrated in FIG. 3. In the second exemplary embodiment, an RLC sub-layer 5 and a MAC sub-layer 6 included in the layer structure 3 have configurations as illustrated in a block diagram in FIG. 2.

Note that the following description of the second exemplary embodiment omits descriptions of the layer structure 3 and the wireless unit 8 illustrated in FIG. 3. Furthermore, in the configurations of the RLC sub-layer 5 and the MAC sub-layer 6 illustrated in FIG. 2, the component portions having the same names as those of the RLC sub-layer 5 and the MAC sub-layer 6 illustrated in FIG. 4 are given the same reference signs as in FIG. 4 and redundant descriptions of those common components are omitted.

Figure 4:
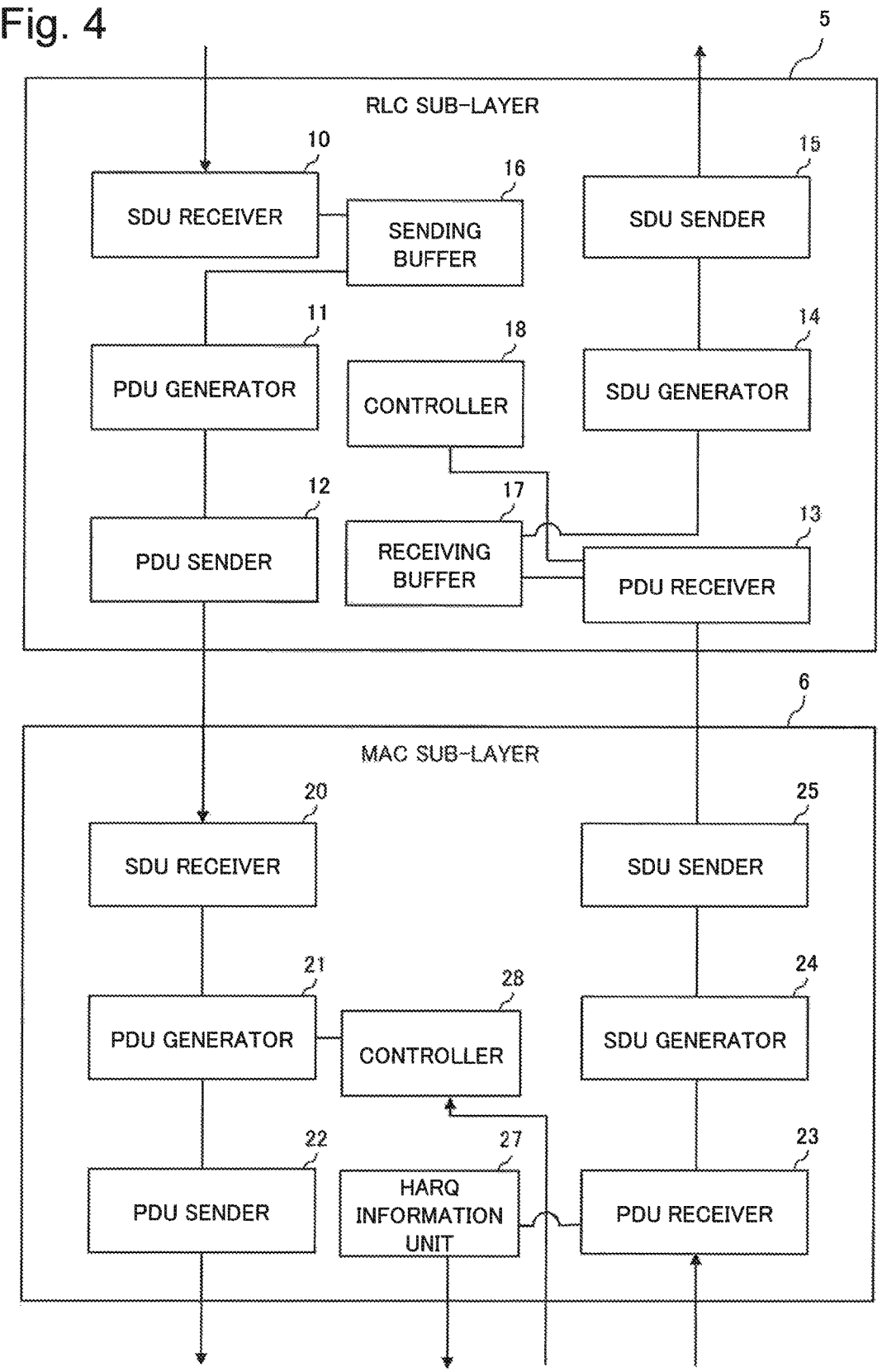
FIG. 4 is a block diagram illustrating a configuration example of a communication apparatus.

In the second exemplary embodiment, the RLC sub-layer 5 includes a sequence matcher 31 in addition to the configuration as illustrated in FIG. 4. Furthermore, the MAC sub-layer 6 includes a notifier 32 in addition to the configuration illustrated in FIG. 4. Note that a PDU generator 11 and a controller 18 constitute a sending controller 30.

The notifier 32 has a function of notifying the RLC sub-layer 5 of re-sending start information indicating that the error correction re-sender 43 has started a re-sending process of re-sending error correction-object data in order to perform error correction on the basis of operation information on the error correction re-sender 43. The state and fashion of the re-sending start information are not limited and examples thereof are cited below. For example, the notifier 32 notifies the RLC sub-layer 5 of a sequence number SN that is a reference number attached to RLC-PDU contained in MAC-PDU of a re-sending object, as re-sending start information,. Alternatively, it is assumed that the RLC sub-layer 5 includes such a configuration that, when a PDU sender 12 of the RLC sub-layer 5 sends RLC-PDU (MAC-SDU) to the MAC sub-layer 6, identification information ID (identification) is attached to the to-be-sent PDU. In this case, the notifier 32 may be configured to notify, as re-sending start information, the identification information ID attached to the re-sending-object MAC-PDU to the RLC sub-layer 5.

The notifier 32 further has a function of notifying the RLC sub-layer 5 of re-sending end information indicating that the re-sending process by the error correction re-sender 43 has ended on the basis of the operation information on the error correction re-sender 43. The state or fashion of the re-sending end information is not limited, and examples thereof are cited below. For example, the notifier 32 notifies the RLC sub-layer 5 of a sequence number SN attached to the RLC-PDU contained in MAC-PDU the re-sending of which has ended, as the re-sending end information. Alternatively, the notifier 32 may be configured to notify the RLC sub-layer 5 of the identification information ID attached to MAC-PDU the re-sending of which has ended, as the re-sending end information.

The sequence matcher 31 has a function of outputting an update-blocking signal to the sending controller 30 during a period from when the notifier 32 outputs the re-sending start information to when the notifier 32 outputs the re-sending end information. The sending controller 30 (controller 18) does not update the sending window range set in the sending buffer 16 (the range represented by sequence numbers (reference numbers) SN) while receiving the update-blocking signal,. In other words, the sending controller 30 controls the sending window range so that the sequence number SN of the data (MAC-PDU) subjected to the re-sending process by the error correction re-sender 43 does not get out of the sending window range.

Figure 5:
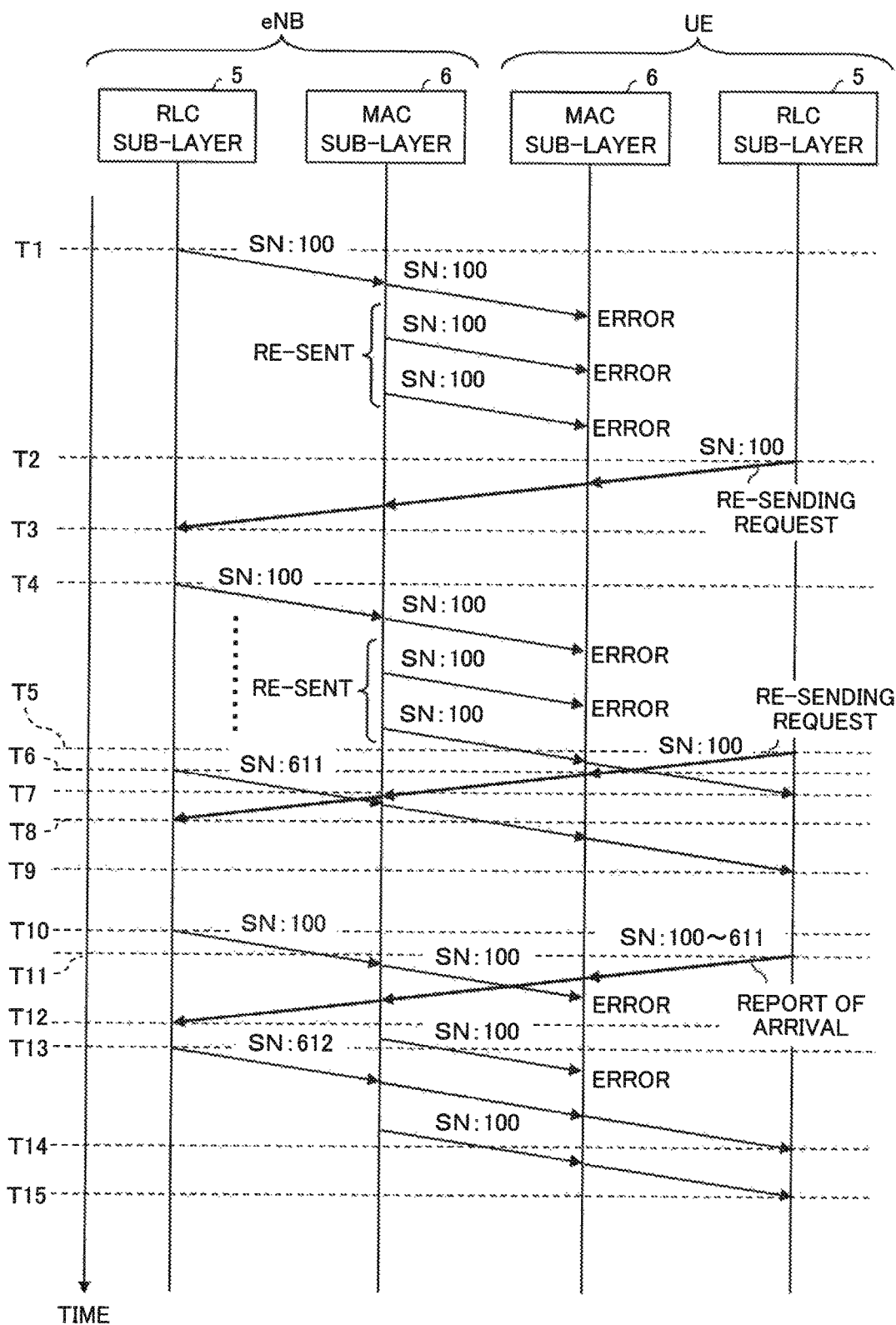
FIG. 5 is a diagram illustrating an operation example of the communication apparatus illustrated in FIG. 4.

With regard to the RLC sub-layer 5 and the MAC sub-layer 6, examples of characteristic operations in the second exemplary embodiment will be described below. For example, at the time T12 indicated in FIG. 5, a report of arrival indicaing that data having sequence numbers SN=100 to 611 have reached a communication partner is notified to the RLC sub-layer 5. However, in the second exemplary embodiment, due to the functions of the notifier 32 and the sequence matcher 31, the controller 18 of the sending controller 30 does not update (move) the sending window. Therefore, the sequence number SN that indicates the lower end of the sending window is "100" and the sequence number SN that indicates the upper end of the sending window remains "611". Therefore, at the time T13, the data whose sequence number SN=612 is not sent in the second exemplary embodiment whereas, in the example illustrated in FIG. 5, data having a sequence number SN=612 that is within the next sending window is sent.

Thus, because the data whose sequence number SN=612 is not sent to the communication partner, the sequence number SN that indicates the lower end of the receiving window of the communication partner is "612" and the sequence number SN that indicates the upper end thereof remains "99". Therefore, even when the data whose sequence number SN=100 reaches the RLC sub-layer 5 of the communication partner at the time T15, the sequence number SN=100 of the data is outside the range of the receiving window and therefore is not stored in the receiving buffer 17.

After that, the re-sending process by the error correction re-sender 43 ends, so that the operation of blocking the sequence matcher 31 from updating the sending window range is canceled. Then, the controller 18 updates the sending window range to the sending window range for the next sending object, so that the sequence number SN that indicates the lower end of the sending window becomes "612" and the sequence number SN that indicates the upper end of the sending window becomes "99".

Since the communication apparatus of the second exemplary embodiment includes the notifier 32 and the sequence matcher 31, the communication apparatus is able to prevent the problem that the re-sending process by the error correction re-sender 43 results in a fault occurring in the data reception by the communication partner.

Note that, in the second exemplary embodiment, the notifier 32 notifies the re-sending start information and the re-sending end information to the RLC sub-layer 5 and the sequence matcher 31 blocks the sending controller 30 from updating the sending window range during the period from reception of the re-sending start information to reception of the re-sending end information. Instead of this configuration, the notifier 32 may have a configuration in which only the re-sending start information out of the re-sending start information and the re-sending end information is notified to the RLC sub-layer 5. In this case, the sequence matcher 31 blocks the sending controller 30 from updating the sending window range during elapse of a preset period from when the sequence matcher 31 receives the re-sending start information. That is, the amount of time needed for the re-sending process by the error correction re-sender 43 is substantially constant and can be known beforehand. Therefore, when the start timing of the re-sending process is known, the end timing of the re-sending process can be estimated. By utilizing this, the sequence matcher 31 may be configured so as to end the operation of blocking the updating of the sending window range.

Furthermore, the notifier 32 may be configured so that, while the error correction re-sender 43 is performing the re-sending process, the sequence number SN or the identification information ID of re-sending-object data may be intermittently notified as information indicating that the re-sending process is being performed. In this case, the sequence matcher 31 starts the operation of blocking the updating of the sending window range when the sequence matcher 31 begins to receive a sequence number SN or identification information ID. When the sequence matcher 31 does not receive the next sequence number SN or identification information ID even after elapse of a preset wait time from when the sequence matcher 31 receives the sequence number SN or identification information ID, the sequence matcher 31 determines that the re-sending process has ended. Then, the sequence matcher 31 may end the operation of blocking the updating of the sending window range.

Third Exemplary Embodiment

A third exemplary embodiment of the present invention will be described below. Note that, in the description of the third exemplary embodiment, the component portions having the same names as those of the communication apparatus of the second exemplary embodiment are given the same reference signs and redundant descriptions of those common components are omitted.

The communication apparatus of the second exemplary embodiment blocks the updating of the sending window range so as to restrict the sending of data by the sending controller 30 and therefore prevents a fault in the data reception by the communication partner. In the third exemplary embodiment, a fault in the data reception by the communication partner is prevented by controlling the re-sending process performed by an error correction re-sender 43.

Specifically, in the third exemplary embodiment, a sequence matcher 31 has a function of detecting that the error correction re-sender 43 is performing the re-sending process on the basis of information notified by a notifier 32 and acquiring information that identifies data that are under the re-sending process (the sequence number SN or identification information ID on the data). Furthermore, a sequence matcher 31 has a function of outputting a re-sending stop signal to the MAC sub-layer 6 when there is data whose the arrival has been reported from the communication partner despite the data is the object of re-sending process by the error correction re-sender 43. After receiving the re-sending stop signal, the error correction re-sender 43 of the MAC sub-layer 6 stops the re-sending process. Note that, at the time of receiving the re-sending stop signal, the error correction re-sender 43 may immediately stop the re-sending process or may continue a series of re-sending processes that is in progress and avoid performing the next series of re-sending processes even when the next series of re-sending processes would otherwise be performed.

The communication apparatus of the third exemplary embodiment includes a configuration in which when there is re-sending process-object data but the arrival of the data has been reported from a communication partner, the re-sending process of the data is stopped. Because of this, the communication apparatus of the third exemplary embodiment, similar to the communication apparatus of the second exemplary embodiment, can prevent the re-sending process performed by the error correction re-sender 43 from resulting in a fault in the sequence in which the communication partner receives data as well.

Other Exemplary Embodiments

Note that the present invention is not limited to the first to third exemplary embodiments but can take various other embodiments as well. For example, in the second and third exemplary embodiments, the functions (configuration) of the RLC sub-layer 5 have been described by taking as an example the case where the RLC sub-layer 5 operates in the acknowledged mode (AM). In the case where the RLC sub-layer 5 operates in the unacknowledged mode (UM), too, the window control is performed for data communication. This means that the configuration described in the second exemplary embodiment is applicable to a communication apparatus that includes the RLC sub-layer 5 that operates in the UM as well.

Furthermore, although the second and third exemplary embodiments use 1024 ($=2^{10}$) consecutive integer values as the sequence numbers SN, the number of sequence numbers SN is appropriately set according to, for example, the communication capacities of communication apparatuses and communication lines and the like. For example, the number of sequence numbers SN may be 2048 ($=2^{11}$).

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A communication apparatus comprising:
   a controller configured to determine, among data units provided with reference numbers, a first group that includes data units to be sent to another communication apparatus;
   a sender configured to send the data units in the first group to the another communication apparatus; and
   a receiver configured to receive, from the another communication apparatus, information that indicates a reception situation regarding the data units in the first group, wherein
   the sender is configured to, when the reception situation indicates a reception error regarding at least one of the data units in the first group, execute a re-sending process of the data unit corresponding to the reception error, and
   the controller is configured to either prevent the sender from sending a data unit in a second group when the sender is executing the re-sending process of the data unit corresponding to the reception error, or stop the re-sending process executed by the sender when the receiver receives a report of arrival of the data unit corresponding to the reception error from the another communication apparatus while the sender is executing the re-sending process of the data unit corresponding to the reception error, and wherein
   the communication apparatus further comprises a notifier configured to output re-sending start information indicating that the sender has started re-sending process and re-sending end information indicating that the sender has ended the resending process, and
   the controller is configured to prevent the sender from sending any data unit in the second group during a period from when the controller is notified of the re-sending start information to when the controller is notified of the re-sending end information.

2. The communication apparatus according to claim 1, wherein
   the controller is configured to prevent the sender from sending any data unit in the second group during elapse of a preset period from when the controller is notified of the re-sending start information.

3. The communication apparatus according to claim 1, further comprising a notifier configured to output, in a preset cycle, re-sending information indicating that the sender is executing a re-sending process, wherein
the controller is configured to cause the sender to send a data unit in the second group when the controller, after being notified of the re-sending information, is not notified again of the re-sending information during the cycle.

4. The communication apparatus according to claim 1, wherein the re-sending start information includes the reference number provided for the data unit on which the sender starts executing a re-sending process.

5. The communication apparatus according to claim 1, further comprising a layer structure that includes a radio link control (RLC) sub-layer and a medium access control (MAC) sub-layer, wherein
the RLC sub-layer includes the controller and the MAC sub-layer includes the sender.

6. The communication apparatus according to claim 1, wherein
the reference number is a sequence number provided for the data unit by sequentially repeatedly using integer values within a preset numerical value range, and
the sender sends the data units altogether by window control that uses the sequence numbers.

7. The communication apparatus according to claim 1, wherein the first group and the second group each include data units provided with consecutive reference numbers and a largest value of the reference numbers provided for the data units of one of the first group and the second group is smaller by one than a smallest value of the reference numbers provided for the data units of another one of the first group and the second group.

8. A communication control method performed by a communication apparatus, the method comprising:
determining, among data units provided with reference numbers, a first group that includes data units to be sent to another communication apparatus;
sending the data units in the first group to the another communication apparatus;
receiving, from the another communication apparatus, information that indicates a reception situation regarding the data units in the first group;
executing, when the reception situation indicates a reception error regarding at least one of the data units in the first group, a re-sending process of the data unit corresponding to the reception error;
either preventing a data unit in a second group from being sent when a re-sending process of the data unit corresponding to the reception error is being executed or stopping the re-sending process when a report of arrival of the data unit corresponding to the reception error is received from the another communication apparatus while the re-sending process of the data unit corresponding to the reception error is being execute;
outputting re-sending start information indicating that a re-sending process has been started and re-sending end information indicating that the resending process has been ended; and
preventing any data unit in the second group from being resent during a period from when the re-sending start information is notified to when the re-sending end information is notified.

9. A non-temporary program recording medium, the program causing a computer to execute the steps of:
determining, among data units provided with reference numbers, a first group that includes data units to be sent to another communication apparatus;
sending the data units in the first group to the another communication apparatus;
receiving, from the another communication apparatus, information that indicates a reception situation regarding the data units in the first group;
executing, when the reception situation indicates a reception error regarding at least one of the data units in the first group, a re-sending process of the data unit corresponding to the reception error;
either preventing a data unit in a second group from being sent when a re-sending process of the data unit corresponding to the reception error is being executed or stopping the re-sending process when a report of arrival of the data unit corresponding to the reception error is received from the another communication apparatus while the re-sending process of the data unit corresponding to the reception error is being execute;
outputting re-sending start information indicating that a re-sending process has been started and re-sending end information indicating that the resending process has been ended; and
preventing any data unit in the second group from being resent during a period from when the re-sending start information is notified to when the re-sending end information is notified.

* * * * *